(12) United States Patent
Tomatsuri et al.

(10) Patent No.: US 7,077,224 B2
(45) Date of Patent: Jul. 18, 2006

(54) HYBRID VEHICLE AND METHOD OF CONTROLLING THE SAME

(75) Inventors: Mamoru Tomatsuri, Toyota (JP); Osamu Harada, Toyota (JP); Yukio Kobayashi, Kasugai (JP); Katsuhiko Yamaguchi, Nisshin (JP); Kiyoshiro Ueoka, Nisshin (JP); Takahiro Nishigaki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 10/614,889

(22) Filed: Jul. 9, 2003

(65) Prior Publication Data
US 2004/0007403 A1 Jan. 15, 2004

(30) Foreign Application Priority Data
Jul. 19, 2002 (JP) .............................. 2002-211373

(51) Int. Cl.
*B60L 15/20* (2006.01)
(52) U.S. Cl. ..................... 180/65.3; 180/65.8; 701/22; 123/142.5 R; 903/941; 903/942
(58) Field of Classification Search ............... 180/65.2, 180/65.3, 65.4, 65.6, 65.8; 123/142.5 R, 123/142.5 E; 701/113
See application file for complete search history.

(56) References Cited

U.S. PATENT DOCUMENTS

| | | | | |
|---|---|---|---|---|
| 4,088,109 A | * | 5/1978 | Woodruff et al. ...... | 123/179.21 |
| 5,050,545 A | * | 9/1991 | Shirata et al. ......... | 123/179.21 |
| 5,251,440 A | * | 10/1993 | Bong-dong et al. ..... | 60/329 |
| 5,285,963 A | * | 2/1994 | Wakefield et al. ...... | 237/2 A |
| 5,347,966 A | * | 9/1994 | Mahon et al. ......... | 123/179.21 |
| 5,390,493 A | * | 2/1995 | Fujishita et al. ....... | 602/284 |
| 5,469,819 A | * | 11/1995 | Berger et al. ......... | 123/179.6 |
| 5,781,877 A | * | 7/1998 | Rachel et al. ......... | 701/104 |
| 5,899,183 A | * | 5/1999 | Aoki et al. .......... | 123/142.5 R |
| 6,253,866 B1 | * | 7/2001 | Kojima .............. | 180/65.2 |
| 6,293,241 B1 | * | 9/2001 | Suzuki .............. | 123/142.5 R |
| 6,459,166 B1 | * | 10/2002 | Yanase et al. ......... | 290/40 C |
| 6,532,911 B1 | * | 3/2003 | Suzuki et al. ......... | 123/41.14 |
| 6,564,757 B1 | * | 5/2003 | Suzuki et al. ......... | 123/41.14 |

(Continued)

FOREIGN PATENT DOCUMENTS

DE 3841 978 A1 6/1990

(Continued)

OTHER PUBLICATIONS

Japanese Official Communication dated Aug. 25, 2004 with English translation including Japanese Examiner's Comment.

(Continued)

*Primary Examiner*—Jeff Restifo
(74) *Attorney, Agent, or Firm*—Kenyon & Kenyon LLP

(57) ABSTRACT

When a starter switch is switched from OFF to ON, a hybrid ECU determines that a driver intends to start driving a vehicle, reads a temperature of each of items (engine coolant, injectors, lubricating oil, and the like), and makes a determination on the necessity of preheating depending on whether each of the items has reached a corresponding one of suitable temperatures. If preheating is required, the hybrid ECU sets an engine start permission flag so as to prohibit the engine from being started, and instructs an engine ECU to preheat the item requiring preheating. On the other hand, if every one of the items has reached the suitable temperature range of its own, the hybrid ECU determines that preheating is not required, and sets the engine start permission flag so as to permit the starting of the engine.

13 Claims, 3 Drawing Sheets

U.S. PATENT DOCUMENTS

| | | | |
|---|---|---|---|
| 6,615,772 B1 * | 9/2003 | Ichinose et al. | 123/41.14 |
| 6,629,512 B1 * | 10/2003 | Iwatani et al. | 123/41.14 |
| 6,647,961 B1 * | 11/2003 | Suzuki et al. | 123/406.53 |
| 6,681,725 B1 * | 1/2004 | Kobayashi et al. | 123/41.14 |
| 6,779,737 B1 * | 8/2004 | Murray et al. | 237/2 A |
| 6,810,977 B1 * | 11/2004 | Suzuki | 180/65.2 |
| 6,820,471 B1 * | 11/2004 | Ito | 73/118.1 |
| 6,843,216 B1 * | 1/2005 | Suzuki et al. | 123/142.5 R |
| 2001/0032621 A1 | 10/2001 | Kojima et al. | |
| 2002/0043410 A1 | 4/2002 | Suzuki | |

FOREIGN PATENT DOCUMENTS

| | | |
|---|---|---|
| EP | 1 127 733 A2 | 8/2001 |
| EP | 1 199 206 A2 | 4/2002 |
| FR | 2 791 481 A1 | 9/2000 |
| JP | 56-17724 | 4/1981 |
| JP | 4-331402 | 11/1992 |
| JP | 5-69328 | 9/1993 |
| JP | 6-54409 | 2/1994 |
| JP | 6-280722 | 10/1994 |
| JP | 2002-054727 A | 2/2002 |
| JP | 2002-122061 A | 4/2002 |
| JP | 2004-7944 | 1/2004 |

OTHER PUBLICATIONS

European Patent Office Communication dated Nov. 3, 2003 with attached European search report.

* cited by examiner

HYBRID VEHICLE AND METHOD OF CONTROLLING THE SAME

INCORPORATION BY REFERENCE

The disclosure of Japanese Patent Application No. 2002-211373 filed on Jul. 19, 2002, including the specification, drawings, and abstract is incorporated herein by reference in its entirety.

BACKGROUND OF THE INVENTION

1. Field of the Invention

The invention relates to a hybrid vehicle and a method of controlling a hybrid vehicle.

2. Description of the Related Art

Heretofore, there have been known hybrid vehicles equipped with an engine and a motor as power sources and running with one or both of them being suitably selected. One of such hybrid vehicles (disclosed in JP-A-2002-122061) is constructed as follows. This hybrid vehicle is provided with a heat accumulator that maintains part of engine coolant at a certain temperature. When a starter switch is closed, the hybrid vehicle waits in a state where running by a motor is possible. If coolant in the heat accumulator is higher in temperature than coolant in the engine by a predetermined degree or more, the coolant in the heat accumulator is delivered into the engine. After the temperature of the coolant in the engine has reached a predetermined preheating temperature, the engine is started.

In this hybrid vehicle, however, the preheating of the engine is started when the starter switch is switched from OFF to ON. Therefore, the preheating of the engine is started, for example, even when a driver turns the starter switch ON simply for the purpose of listening to music on an onboard stereo with no intention of starting to drive the vehicle. In such a case, heat accumulated in the heat accumulator may be wastefully consumed. On the other hand, since the engine is started after the temperature of coolant in the engine has reached the predetermined preheating temperature, an improvement in startability or exhaust emission properties is achieved in comparison with a case where the engine is started at a low engine temperature. However, there are demands for a further improvement in startability or exhaust emission properties.

SUMMARY OF THE INVENTION

It is an object of the invention to provide a hybrid vehicle capable of appropriately preheating an engine or parts associated therewith without causing wastefulness, and a method of controlling such a hybrid vehicle.

According to a first aspect of the invention, a hybrid vehicle that is equipped with an engine and a motor as power sources and that runs with one or both of the engine and the motor being suitably selected comprises a heat impartation element, an intention determination element, a heat impartation control element, and a running control element. The heat impartation element can impart heat to the engine or parts associated with the engine. The intention determination element determines whether or not a driver intends to start driving the vehicle before the engine is started. The heat impartation control element imparts heat to the engine or the parts associated with the engine by means of the heat impartation element until preheating of the engine or the parts associated with the engine is completed, if the intention determination element detects that the driver intends to start driving the vehicle before the engine is started. The running control element performs running control of the vehicle while using the motor as a power source and refraining from starting the engine until the preheating is completed. Namely, in this hybrid vehicle, since heat is imparted to the engine or the parts associated with the engine (hereinafter referred to as "the engine and the like") when the driver intends to start driving the vehicle, the engine and the like are prevented from being wastefully preheated despite a stopped state of the vehicle. Further, since running control is performed while using the motor as a power source and refraining from starting the engine until the preheating of the engine and the like is completed, an improvement in exhaust emission properties or fuel consumption is achieved in comparison with a case where the engine is stated at a low engine temperature.

It is to be noted herein that "the parts associated with the engine" constitute a main body system, an intake system, an exhaust system, a fuel system, a cooling system, a lubrication system, and a power transmission system of the engine. Examples of the parts associated with the engine will be mentioned hereinafter. The parts constituting the main body system include cylinders, a cylinder block, pistons, intake/exhaust valves, ignition plugs, igniters, and the like. The parts constituting the intake system include an air cleaner, an airflow meter, a throttle body, a surge tank, an intake manifold, and the like. The parts constituting the exhaust system include an exhaust manifold, a catalytic converter, an oxygen sensor, an NOx sensor, a muffler, and the like. The parts constituting the fuel system include a fuel tank, a filter, a fuel pump, injectors, and the like. The parts constituting the cooling system include engine coolant, a radiator, and the like. The parts constituting the lubrication system include an oil pan, engine oil, brake oil, ATF (automatic transmission fluid), and the like. The parts constituting the power transmission system include a clutch, a transmission, planetary gears, a differential gear, and the like.

In the hybrid vehicle of the invention, the intention determination element may determine that the driver intends to start driving the vehicle, when a starter is turned ON. In general, the starter is turned ON when the driver is about to start driving the vehicle. Therefore, it is preferable to determine that the driver intends to start driving the vehicle when the starter is turned ON, and to start preheating the engine and the like.

In the hybrid vehicle of the invention, the intention determination element may determine that the driver intends to start driving the vehicle, when a shift lever is shifted to a position enabling the vehicle to be driven. In general, the shift lever is shifted to a position enabling the vehicle to be driven (e.g., a D range) when the driver is about to start driving the vehicle. Therefore, it is preferable to determine that the driver intends to start driving the vehicle when the shift lever is shifted to a position enabling the vehicle to be driven, and to start preheating the engine and the like.

In the hybrid vehicle of the invention, the intention determination element may determine that the driver intends to start driving the vehicle, when an accelerator pedal is depressed. In general, the accelerator pedal is depressed when the driver is about to start driving the vehicle. Therefore, it is preferable to determine that the driver intends to start driving the vehicle when the accelerator pedal is depressed, and to start preheating the engine and the like.

In the hybrid vehicle of the invention, the intention determination element may determine that the driver intends to start driving the vehicle, when a vehicle speed has exceeded a predetermined speed. In general, if the vehicle speed exceeds a predetermined speed, the vehicle will almost certainly keep running afterwards. Therefore, it is preferable to determine that the driver intends to start driving the vehicle when the vehicle speed exceeds a predetermined speed, and to start preheating the engine and the like.

In the hybrid vehicle of the invention, the intention determination element may determine that the driver intends to start driving the vehicle, when any two or more of a condition that the starter be turned ON, a condition that the shift lever be shifted to a position enabling the vehicle to be driven, a condition that the accelerator pedal be depressed, and a condition that the vehicle speed exceed a predetermined speed are fulfilled. For example, it may be determined that the driver intends to start driving the vehicle on the conditions that the starter be turned ON and that the shift lever be shifted to a position enabling the vehicle to be driven. Also, it may be determined that the driver intends to start driving the vehicle on the conditions that the starter be turned ON, that the shift lever be shifted to a position enabling the vehicle to be driven, and that the accelerator pedal be depressed. Alternatively, it may be determined that the driver intends to start driving the vehicle on the conditions that the starter be turned ON, that the shift lever be shifted to a position enabling the vehicle to be driven, that the accelerator pedal be depressed, and that the vehicle speed exceed a predetermined speed.

Incidentally, a determination on the condition that the starter be turned ON is made earlier than determinations on the other conditions. Thus, the timing for starting preheating is correspondingly advanced, so that the timing for completing preheating and the timing for starting the engine are advanced as well. On the other hand, a determination on the condition that the vehicle speed exceed a predetermined speed is made later than determinations on the other conditions. Thus, the timing for starting preheating is correspondingly retarded, so that the timing for completing preheating and the timing for starting the engine are retarded as well. Nonetheless, the determination on the condition that the vehicle speed exceed a predetermined speed demonstrates the highest reliability in confirming the driver's intention of starting to drive the vehicle.

In the hybrid vehicle of the invention, it is preferable that the parts associated with the engine be items that improve at least one of exhaust emission properties, fuel consumption, driveability, and engine startability by being preheated. For example, the parts associated with the engine as described herein include engine coolant, injectors, a cylinder block, lubricating oil (engine oil, ATF, and the like), an oxygen sensor, an exhaust gas purification catalyst, and the like.

According to a second aspect of the invention, a hybrid vehicle that is equipped with an engine and a motor as power sources and that runs with one or both of the engine and the motor being suitably selected comprises heat impartation means, intention determination means, heat impartation control means, and running control means. The heat impartation means can impart heat to the engine or parts associated with the engine. The intention determination means determines whether or not a driver intends to start driving the vehicle before the engine is started. The heat impartation control means imparts heat to the engine or the parts associated with the engine by means of the heat impartation means until preheating of the engine or the parts associated with the engine is completed, if the intention determination means detects that the driver intends to start driving the vehicle before the engine is started. The running control means performs running control of the vehicle while using the motor as a power source and refraining from starting the engine until the preheating is completed.

According to a third aspect of the invention, a method of controlling a hybrid vehicle that is equipped with an engine and a motor as power sources and that runs with one or both of the engine and the motor being suitably selected comprises the steps of determining whether or not a driver intends to start driving the vehicle before the engine is started, imparting heat to the engine or parts associated with the engine until preheating of the engine or the parts associated with the engine is completed, if it is determined that the driver intends to start driving the vehicle, and performing running control of the vehicle while using the motor as a power source and refraining from starting the engine until the preheating is completed. In this control method, since heat is imparted to the engine and the like when the driver intends to start driving the vehicle, the engine and the like are prevented from being wastefully preheated despite a stopped state of the vehicle. Further, since running control is performed while using the motor as a power source and refraining from starting the engine until the preheating of the engine and the like is completed, no deterioration in exhaust emission properties or fuel consumption as observed during cold start of the engine is caused.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENT

Figure 1:
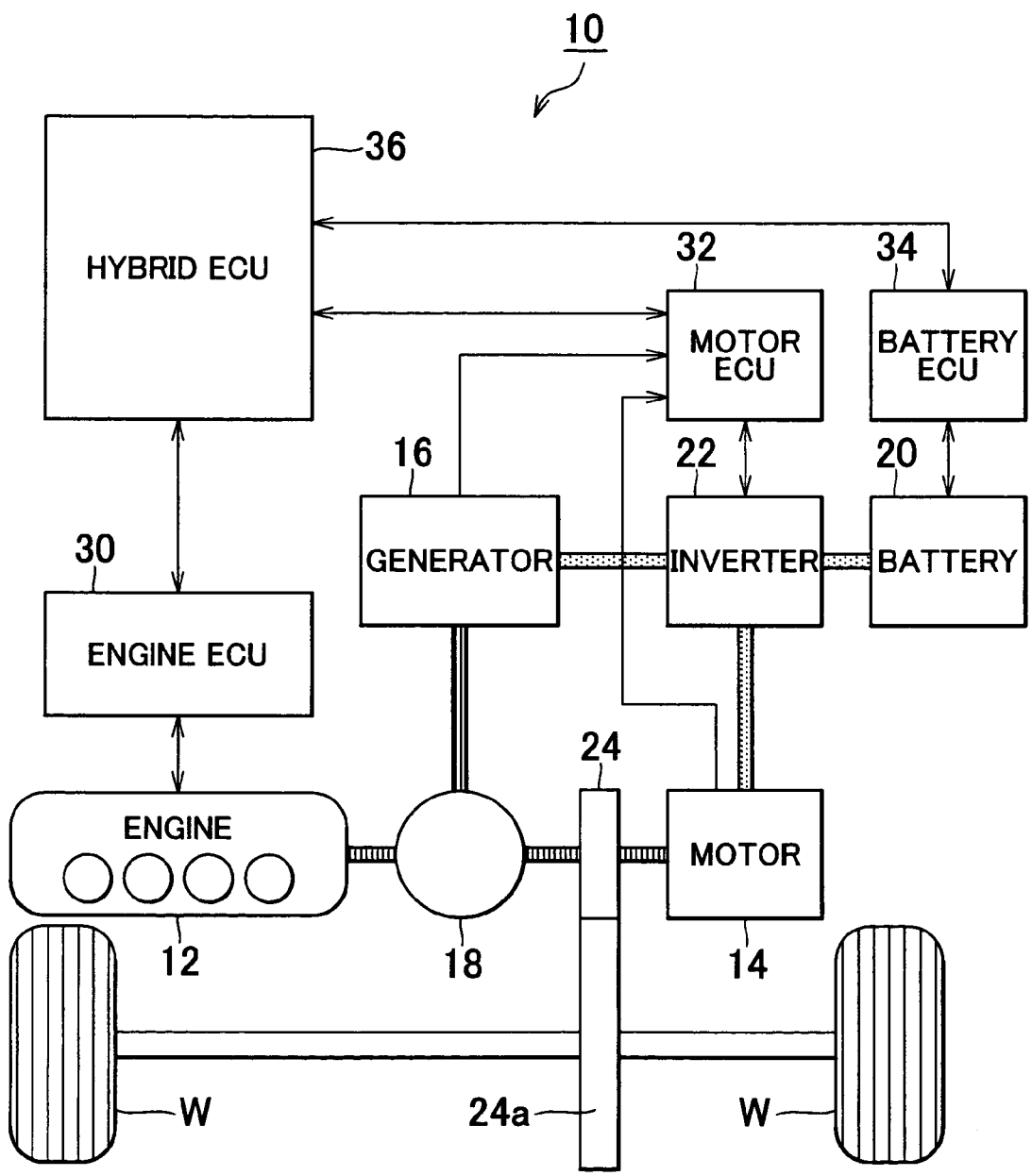
FIG. 1 is an explanatory view of the overall construction of a hybrid vehicle in accordance with an embodiment of the invention.
Figure 2:
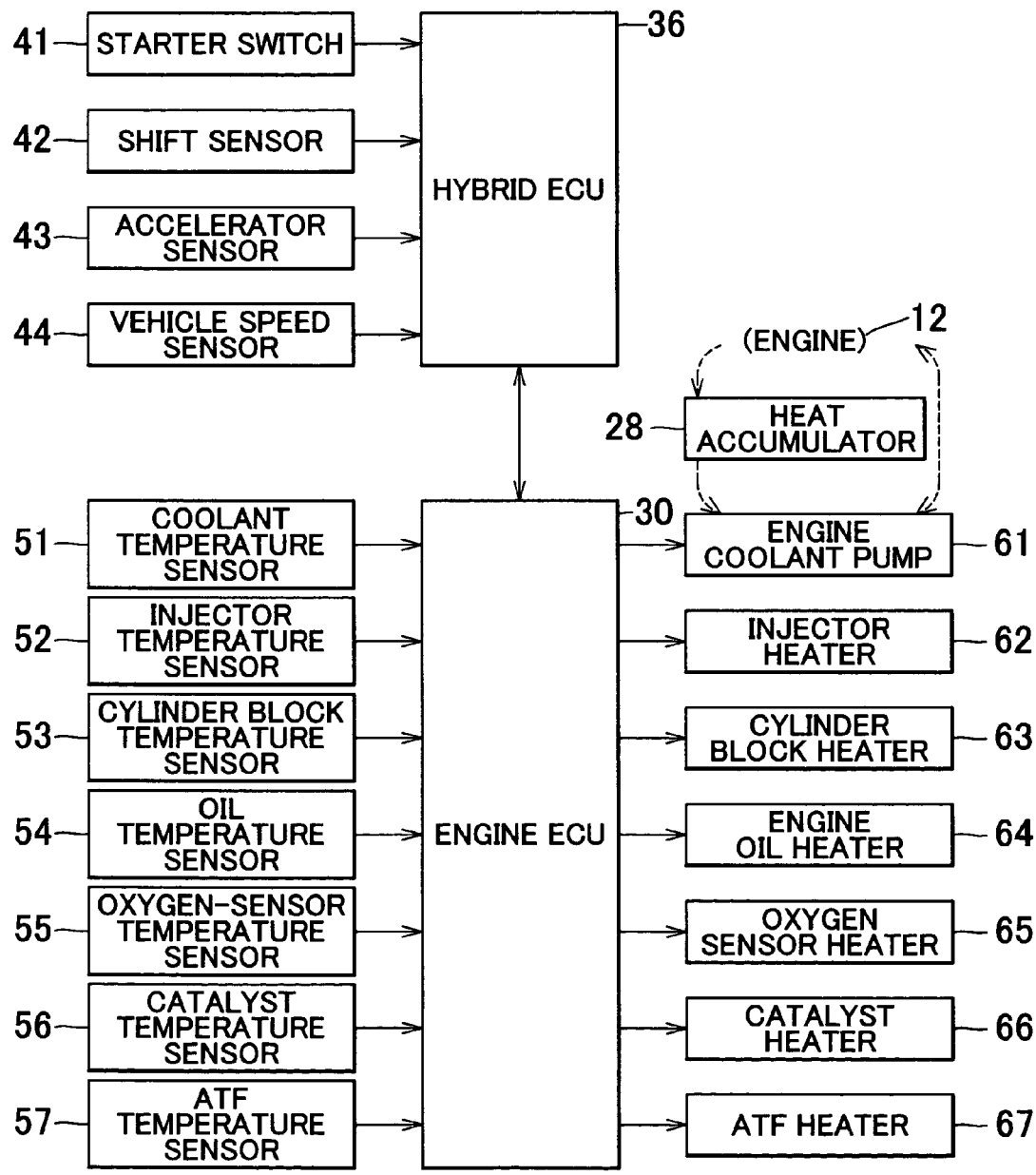
FIG. 2 is a block diagram representing the construction concerning control of the hybrid vehicle.

Next, the embodiment of the invention will be described with reference to the drawings. FIG. 1 is an explanatory view of the overall construction of a hybrid vehicle 10 of the embodiment. FIG. 2 is a block diagram representing the construction concerning control of the hybrid vehicle 10.

The hybrid vehicle 10 of the embodiment includes an engine 12, a motor 14, a generator 16, a power-splitting mechanism 18, a battery 20, an inverter 22, a transmission 24, and a hybrid electronic control unit 36. The engine 12 generates power by compressing and then expanding the mixture of fuel and air in cylinders. The motor 14 generates power through a three-phase current causing a rotor to rotate. The generator 16 generates power for driving the motor 14 and power for charging the battery 20. The power-splitting mechanism 18 splits power generated by the engine 12 into power for driving wheels W and power for the generator 16. The battery 20 supplies and recovers power with a high voltage. The inverter 22 controls current. The transmission 24 transmits power delivered from the power-splitting mechanism 18 to the driving wheels W. The hybrid electronic control unit 36 performs various controls. It is to be noted herein that an electronic control unit will hereinafter be referred to as simply an "ECU".

An engine ECU 30, to which signals delivered from various sensors for detecting an operational state of the engine 12 are input, subjects the engine 12 to operational controls such as a fuel injection control, an ignition control, an intake air amount adjustment control, and the like. The engine ECU 30 is in communication with the hybrid ECU 36. The engine ECU 30 performs the operational controls of the engine 12 by means of control signals delivered from the hybrid ECU 36, and if necessary, outputs data regarding an operational state of the engine 12 to the hybrid ECU 36.

As shown in FIG. 2, the engine 12 includes a coolant temperature sensor 51, a heat accumulator 28, a coolant pump 61, a cylinder block temperature sensor 53, and a cylinder block heater 63. The coolant temperature sensor 51 detects a temperature of coolant in the engine. The heat accumulator 28 takes out part of engine coolant that has been heated up to a high temperature during operation of the engine, and maintains it at the certain high temperature. The coolant pump 61 sends coolant maintained at a certain high temperature from the heat accumulator 28 into the engine. The cylinder block temperature sensor 53 detects a temperature of a cylinder block. The cylinder block heater 63 is mounted to the cylinder block. By sending coolant maintained at a certain high temperature into the engine when the temperature of the engine is low or heating the cylinder block, the engine is suitably warmed. Further, the engine 12 includes an injector temperature sensor 52 for detecting temperatures of injectors for injecting gasoline, and an injector heater 62 capable of heating the injectors. By heating the injectors up to a predetermined temperature or to a temperature higher than the predetermined temperature when the temperature of the engine is low, fuel injected from the injectors can be suitably atomized.

An oil pan (not shown) for storing engine oil is provided in the vicinity of the engine 12. The oil pan is designed such that engine oil is supplied from the oil pan to spaces among parts that are mechanically in contact with one another in the engine 12, and that this engine oil returns to the oil pan again. Installed in this oil pan are an oil temperature sensor 54 for detecting a temperature of engine oil and an engine oil heater 64 capable of heating engine oil. At a predetermined temperature, engine oil exhibits an appropriate viscosity and exerts good lubricating performance without offering considerable resistance.

An oxygen-sensor temperature sensor 55 for detecting a temperature of an oxygen sensor and an oxygen sensor heater 65 capable of heating the oxygen sensor are disposed in an exhaust passage of the engine 12. The oxygen sensor detects a concentration of oxygen contained in exhaust gas for the purpose of A/F (air-fuel ratio) feedback control, and the output characteristic of the oxygen sensor stabilizes at a relatively high temperature (e.g., 400 to 900° C.). In addition, a catalyst temperature sensor 56 for detecting a temperature of a catalytic converter for purifying exhaust gas and a catalyst heater 66 capable of heating the catalytic converter are disposed in this exhaust passage. The catalytic converter exerts purification performance at a predetermined temperature (e.g., 350° C.) or at a temperature higher than the predetermined temperature.

The motor 14 is an alternating-current synchronous motor. As shown in FIG. 1, the motor 14 rotates by being supplied with alternating-current power that has been obtained by converting direct-current power of the battery 20 by means of the inverter 22, or rotates by being supplied with power generated by the generator 16. Incidentally, the motor 14 generates power regeneratively when the vehicle is decelerated or braked.

As is the case with the motor 14, the generator 16 is also an alternating-current synchronous motor. The generator 16 generates power by being operated by part of power of the engine 12, namely, power distributed via the power-splitting mechanism 18, and either charges the battery 20 with direct-current power obtained by converting alternating-current by means of the inverter 22 or operates the motor 14 by the power generated.

The motor 14 and the generator 16 are operationally controlled by a motor ECU 32. The motor ECU 32 is connected to the hybrid ECU 36 such that communication between them is possible. In response to a command signal delivered from the hybrid ECU 36, signals (rotation speed, applied voltage, and the like) necessary for operationally controlling the motor 14 and the generator 16 are input to the motor ECU 32 therefrom. Then, the motor ECU 32 outputs a switching control signal to the inverter 22.

Although not shown, the power-splitting mechanism 18 is a planetary gear composed of a ring gear coupled to a rotational shaft of the motor 14, a sun gear coupled to a rotational shaft of the generator 16, and a carrier coupled to an output shaft of the engine 12. The power-splitting mechanism 18 splits power of the engine 12 into power for the rotational shaft of the motor 14 (linked with the driving wheels W) and power for the rotational shaft of the generator 16.

The battery 20 is a high-voltage battery constructed by connecting a predetermined number of nickel-hydrogen battery cells in series. The battery 20 supplies the motor 14 with accumulated power or is charged with power generated by the motor 14 or the generator 16. The battery 20 is managed by a battery ECU 34. The battery ECU 34 is connected to the hybrid ECU 36 such that communication between them is possible.

The inverter 22 is a power exchange unit that exchanges direct current of the battery 20 and alternating current of the motor 14 or the generator 16 with each other by means of a motor bridge circuit and a generator bridge circuit. Each of the motor bridge circuit and the generator bridge circuit is composed of six power transistors. The inverter 22 is controlled by the motor ECU 32.

The transmission 24 is a mechanism that transmits power of the power-splitting mechanism 18 for the side of the driving wheels W to the driving wheels W via a differential portion 24a, and is designed such that automatic transmission fluid (ATF) for lubrication circulates inside the transmission 24. An ATF temperature sensor 57 for detecting a temperature of ATF and an ATF heater 67 capable of heating ATF are provided in an ATF circulation passage.

Signals are input to the hybrid ECU 36 from a starter switch 41 for detecting rotation of a key to a starter position, a shift sensor 42 for detecting an operational position of a shift lever, an accelerator sensor 43 for detecting a depression stroke of an accelerator pedal, a vehicle speed sensor 44 for detecting a current running speed of the vehicle, and a variety of other sensors (not shown). Further, as shown in FIG. 1, the hybrid ECU 36 is connected to the engine ECU 30, the motor ECU 32, and the battery ECU 34 via communication ports. In response to input signals delivered from the sensors, the hybrid ECU 36 performs hybrid control such that the vehicle runs using at least one of the engine 12 and the motor 14 as a power source, while communicating with the ECU's 30, 32, and 34. In a range of low engine efficiency, for example, when the vehicle starts or runs at a low speed, the hybrid ECU 36 stops the engine 12 and performs control such that the vehicle runs with the driving wheels W being driven by power of the motor 14. On the other hand, when the vehicle runs normally, the hybrid ECU 36 operates the engine 12, splits power of the engine 12 into power for the driving wheels W and power for the generator 16 by means of the power-splitting mechanism 18, causes the generator 16 to generate power, operates the motor 14 by the power generated by the generator 16, and performs control in such a manner as to assist the driving of the driving wheels W. In addition, when the vehicle runs with a high load, for example, when the vehicle is accelerated with the accelerator being fully open, the motor 14 is supplied with power from the battery 20 as well, so that an additional operating force is obtained. While the vehicle is stopped running, the hybrid ECU 36 performs control so as to stop the engine.

Figure 3:
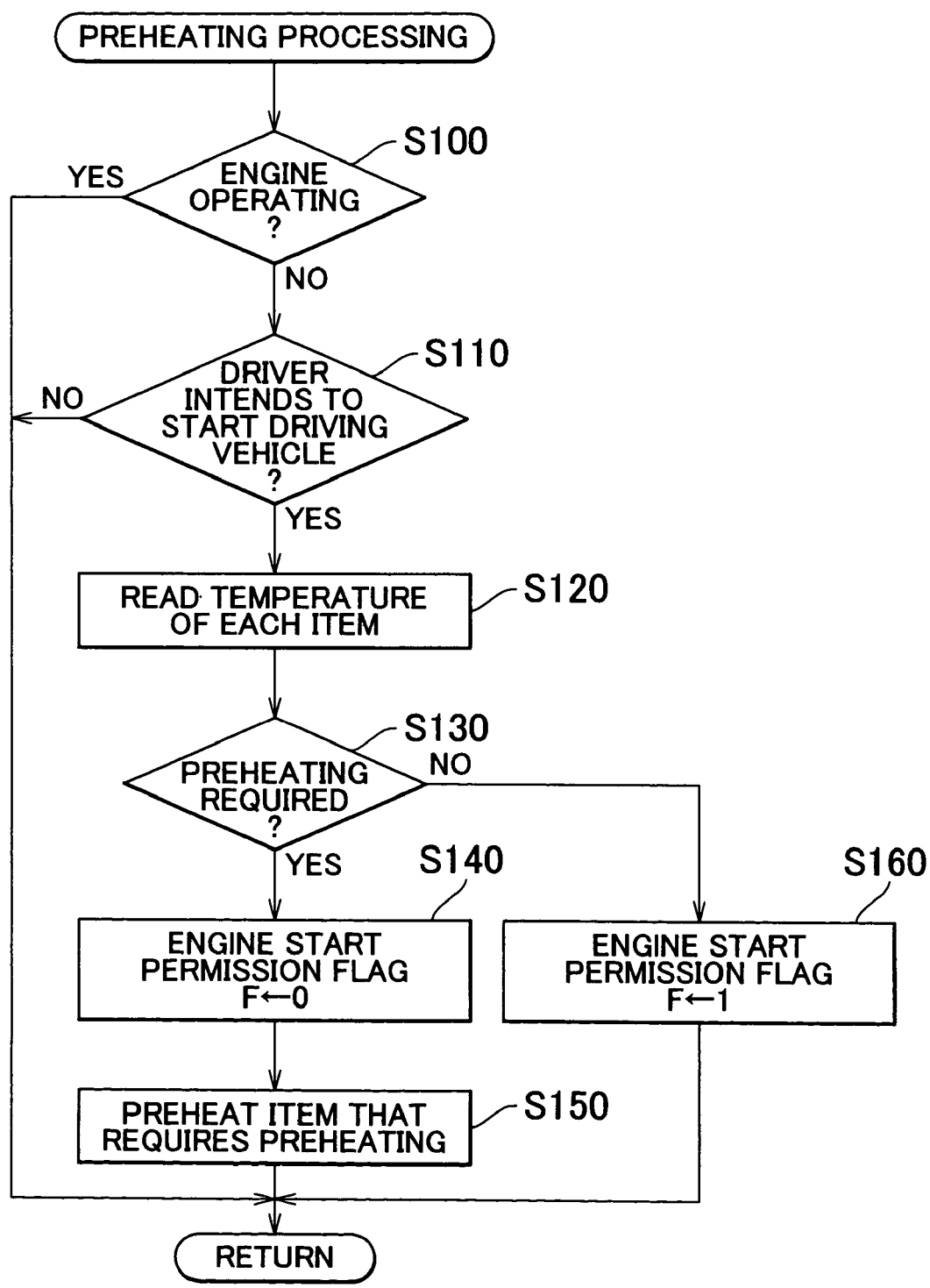
FIG. 3 is a flowchart of a preheating processing program.

Next, operation of the hybrid vehicle 10 in accordance with the embodiment will be described with reference to FIG. 3. At predetermined timings (e.g., at intervals of a few milliseconds), the hybrid ECU 36 reads out a preheating processing program from an internal memory and carries it out. If this preheating processing program is started, the hybrid ECU 36 initially determines whether or not the engine 12 is in operation (step S100). If the engine 12 is already in operation, there is no need to preheat the engine 12 or parts associated therewith. Therefore, the program is immediately terminated. On the other hand, if the engine 12 is stopped running, the hybrid ECU 36 determines whether or not a driver intends to start driving the vehicle (step S110). In this case, if the starter switch 41 is switched from OFF to ON, the hybrid ECU 36 determines that the driver intends to start driving the vehicle. It is to be noted, however, that even if the starter switch 41 has been switched from OFF to ON, the engine is not started by a starter motor (not shown) until preheating is completed as will be described later. In this embodiment, the motor 14 may be utilized as a starter motor, or a starter motor may be provided separately.

If the driver does not intend to start driving the vehicle in step S110, the program is immediately terminated. On the other hand, if the driver intends to start driving the vehicle, the hybrid ECU 36 reads temperatures of respective items (step S120), and determines whether or not preheating is necessary, depending on whether or not each of the items has reached a predetermined suitable temperature range (step S130). In this embodiment, the items are coolant inside the engine, the injectors, the cylinder block, engine oil, the catalytic converter, the oxygen sensor, and ATF. Temperatures of these items are obtained from the engine ECU 30 to which signals delivered from the temperature sensors 51 to 57 have been input. The suitable temperature range of each of the items is set in advance through an experiment or the like, as a temperature at which a corresponding one of the items can operate appropriately. For instance, the suitable temperature range of each of the items is set as follows. The suitable temperature range of coolant in the engine is set as a range in which exhaust emission properties or fuel consumption can be more sufficiently improved than when the temperature of the engine is low. The suitable temperature range of the cylinder block is set as a range in which the engine offers better startability than when the temperature of the engine is low. The suitable temperature range of the injectors is set as a range wherein fuel to be injected is more sufficiently atomized than when the temperature of the engine is low and wherein the engine offers better startability than when the temperature of the engine is low. The suitable temperature range of engine oil or ATF is set as a range in which more moderate flow resistance and more appropriate viscosity can be obtained than when the temperature of the engine is low. The suitable temperature range of the catalytic converter is set as a range in which the catalyst is sufficiently activated. The suitable temperature range of the oxygen sensor is set as a range in which a stable output characteristic is obtained.

If any of the items has not reached a corresponding one of the suitable temperature ranges in step S130, the hybrid ECU 36 determines that it is necessary to preheat that item, resets an engine start permission flag F as "0" so as to prohibit the engine from being started (step S140), instructs the engine ECU 30 to preheat the item that requires preheating (step S150), and terminates the program. Upon receiving an instruction in step S150, the engine ECU 30 drives a coolant pump 61 and causes coolant maintained at a certain temperature in the heat accumulator 28 to be sent into the engine with a view to preheating engine coolant, and energizes each of the heaters 62 to 67 with a view to preheating a corresponding one of the injectors, the cylinder block, engine oil, ATF, the oxygen sensor, and the catalytic converter. On the other hand, if every one of the items has reached a corresponding one of the suitable temperature ranges, the hybrid ECU 36 determines that preheating is unnecessary, sets the engine start permission flag F as "1" so as to permit the engine to be started (step S160), and terminates the program. If the key is removed after the vehicle has stopped running, the engine start permission flag F is reset. Therefore, when the key is inserted next time, the flag indicates "0". In this manner, the hybrid ECU 36 sets the engine start permission flag F, which initially indicates "0", as "1" after the completion of preheating by executing the preheating processing program at the predetermined timings.

While repeatedly executing this preheating processing program, the hybrid ECU 36 performs the aforementioned hybrid control as well. In the hybrid control, if the engine 12 has not been started yet when power of the engine 12 is required, the hybrid ECU 36 determines whether the engine start permission flag F indicates "0" or "1". If this flag F indicates "1", the hybrid ECU 36 starts the engine 12 so as to obtain required power because the starting of the engine is permitted, that is, because the preheating of the engine 12 and the parts associated therewith (the injectors, engine oil, ATF, the oxygen sensor, the catalytic converter, and the like) has been completed. On the other hand, if the flag F indicates "0", the hybrid ECU 36 refrains from starting the engine 12 and copes with the lack of required power by supplementing power by means of the motor 14 because the starting of the engine is not permitted, that is, because the preheating of the engine 12 and the parts associated therewith has not been completed.

It is illustrated herein how the constituents of this embodiment correspond to the constituents of the invention. The coolant pump 61 and the heaters 62 to 67 of the embodiment correspond to the heat impartation element (the heat impartation means) of the invention. The hybrid ECU 36 corresponds to the intention determination element (the intention determination means), the heat impartation control element (the heat impartation control means), and the running control element (the running control means).

In the hybrid vehicle 10 of the embodiment described hitherto, when the starter switch 41 is switched from OFF to ON, the driver is regarded as intending to start driving the vehicle, and the preheating of the engine 12 and the parts associated therewith is started. It is to be noted herein that, when the key assumes an accessory-ON position or an ignition-ON position, the driver may be listening to music on an onboard stereo and does not always intend to start driving the vehicle. On the other hand, when the key assumes a starter-ON position, the driver intends to start the engine 12 and hence to start driving the vehicle. According to the embodiment, therefore, since preheating is not started unless the vehicle is running, the preheating of the engine and the like can be carried out appropriately without causing wastefulness. Also, since the running of the vehicle is controlled with the motor 14 serving as a power source and the starting of the engine 12 is withheld until the preheating of the engine and the like is completed, no deterioration in exhaust emission properties or fuel consumption as observed during cold start of the engine 12 is caused.

Since coolant maintained at a certain temperature in the heat accumulator 28 is delivered into the engine 12 to warm it before the starting thereof, an improvement in exhaust emission properties or fuel consumption is achieved when the engine is started. Since the injectors are heated to a temperature at which fuel injected thereby is well atomized before the engine is started, exhaust emission properties are improved when the engine is started, and the startability of the engine is improved as well. Since the cylinder block is heated to a suitable temperature before the engine is started, the startability of the engine is improved. Since engine oil and ATF are warmed before the starting of the engine until they exhibit suitable viscosity, an improvement in engine startability, driveability, fuel consumption, and the like is achieved, and operation of a power transmission system is smoothened. Since the oxygen sensor is heated to a suitable temperature before the engine is started, A/F feedback control can be excellently performed immediately after the engine has been started, and an improvement in exhaust emission properties and fuel consumption is achieved. Since the catalytic converter is heated to an activation temperature before the engine is started, good purification of exhaust gas is accomplished immediately after the starting of the engine, and exhaust emission properties are improved.

The invention is not limited to the aforementioned embodiment, and the invention can be implemented in various modes as long as they pertain to the technical scope thereof.

In the embodiment described above, for instance, if the key assumes the starter-ON position, it is determined that the driver intends to start driving the vehicle. However, because the driver usually shifts the shift lever to a D range to start the vehicle, the driver's intention of starting to drive the vehicle may also be confirmed when the shift sensor 42 detects that the shift lever assumes a position corresponding to the D range. In particular, if it is determined that the driver intends to start driving the vehicle when the shift lever is shifted to the D range after the starter has been turned ON, the determination on the driver's intention of starting to drive the vehicle is more reliable.

Also, since the driver usually depresses the accelerator pedal during takeoff, the driver's intention of starting to drive the vehicle may be confirmed when the accelerator sensor 43 detects that the depression stroke of the accelerator pedal has exceeded a predetermined amount. Especially, if it is determined that the driver intends to start driving the vehicle when the depression stroke of the accelerator pedal is above the predetermined amount after the shift lever has been shifted to the D range, the determination on the driver's intention of starting to drive the vehicle is more reliable.

Furthermore, if the vehicle speed has exceeded a predetermined speed (threshold), it is generally supposed that the vehicle will almost certainly keep running afterwards. Therefore, the driver's intention of starting to drive the vehicle may also be confirmed when the vehicle speed sensor 44 detects that the vehicle speed has exceeded the threshold. Especially, if it is determined that the driver intends to start driving the vehicle when the vehicle speed is above the threshold after the shift lever has been shifted to the D range, the determination on the driver's intention of starting to drive the vehicle is more reliable. If it is determined that the driver intends to start driving the vehicle when the depression stroke of the accelerator pedal is above the predetermined amount and the vehicle speed is above the threshold after the shift lever has been shifted to the D range, the determination on the driver's intention of starting to drive the vehicle is much more reliable.

Still further, although each of the items is heated until it reaches the predetermined temperature in the aforementioned embodiment, heating may be carried out for a predetermined preheating period. For example, it is appropriate that a heating period required for the attainment of a predetermined temperature range be calculated on the basis of an initial temperature and an outside air temperature, and that the heaters be energized for the heating period.

What is claimed is:

1. A hybrid vehicle that is equipped with an engine and a motor as power sources and that runs with one or both of the engine and the motor being suitably selected, comprising:
   heat impartation element capable of imparting heat to the engine or parts associated with the engine;
   an intention determination element that determines whether or not a driver intends to start driving the vehicle before the engine is started;
   a heat impartation control element that imparts heat to the engine or the parts associated with the engine using the heat impartation element until preheating of the engine or the parts associated with the engine is completed, if the intention determination element determines that the driver intends to start driving the vehicle before the engine is started; and
   a running control element that performs running control of the vehicle while using the motor as a power source and refrains from starting the engine until the preheating is completed,
   wherein the intention determination element determines that the driver intends to start driving the vehicle when at least one of the following is fulfilled: (i) a condition that a shift lever is shifted to a position enabling the vehicle to be driven, and (ii) a condition that a vehicle speed has exceeded a predetermined speed.

2. The hybrid vehicle according to claim 1, further comprising:
   a shift sensor that detects that the shift lever has been shifted to a position enabling the vehicle to be driven,
   wherein, when the shift sensor detects that the shift lever has been shifted to a position enabling the vehicle to be driven, the intention determination element determines the driver intends to start driving the vehicle.

3. The hybrid vehicle according to claim 1, further comprising:
   an accelerator sensor that detects that the accelerator pedal has been depressed,
   wherein, when the accelerator sensor detects that a depression stroke of the accelerator pedal has exceeded a predetermined amount, the intention determination element determines the driver intends to start driving the vehicle.

4. The hybrid vehicle according to claim 1, further comprising:
   a vehicle speed sensor that detects the vehicle speed,
   wherein, when the vehicle speed sensor detects that the vehicle speed has exceeded the predetermined speed, the intention determination element determines the driver intends to start driving the vehicle.

5. The hybrid vehicle according to claim 1, wherein the intention determination element determines that the driver intends to start driving the vehicle when two or more of the following are fulfilled: a condition that a starter be turned ON, the condition that the shift lever be shifted to a position enabling the vehicle to be driven, the condition that the accelerator pedal be depressed, and the condition that the vehicle speed exceed a predetermined speed.

6. The hybrid vehicle according to claim 5, wherein:
a starter switch that detects that the starter has been turned ON;
a shift sensor that detects that the shift lever has been shifted to a position enabling the vehicle to be driven;
an accelerator sensor that detects that the accelerator pedal has been depressed; and
a vehicle speed sensor that detects the vehicle speed,
wherein the intention determination element determines that the driver intends to start driving the vehicle when at least two of the starter switch, the shift sensor, the acceleration sensor, and the vehicle speed sensor detect their respective sensed conditions.

7. The hybrid vehicle according to claim 1, wherein the parts associated with the engine are items that improve at least one of exhaust emission properties, fuel consumption, driveability, and engine startability by being preheated.

8. The hybrid vehicle according to claim 1, wherein the parts associated with the engine include at least one of an engine coolant, a plurality of fuel injectors, a cylinder block, a lubricating oil, an oxygen sensor, and an exhaust gas purification catalyst.

9. A hybrid vehicle that is equipped with an engine and a motor as power sources and that runs with one or both of the engine and the motor being suitably selected, comprising:
heat impartation means capable of imparting heat to the engine or parts associated with the engine;
intention determination means for determining whether or not a driver intends to start driving the vehicle before the engine is started;
heat impartation control means for imparting heat to the engine or the parts associated with the engine by means of the heat impartation means until preheating of the engine or the parts associated with the engine is completed, if the intention determination means determines that the driver intends to start driving the vehicle before the engine is started; and
running control means for performing running control of the vehicle while using the motor as a power source and refraining from starting the engine until the preheating is completed, wherein the intention determination means determines that the driver intends to start driving the vehicle when at least one of the following is fulfilled: (i) a condition that a shift lever is shifted to a position enabling the vehicle to be driven, and (ii) a condition that a vehicle speed has exceeded a predetermined speed.

10. A method of controlling a hybrid vehicle that is equipped with an engine and a motor as power sources and that runs with one or both of the engine and the motor being suitably selected, comprising the steps of:
determining whether a driver intends to start driving the vehicle before the engine is started;
imparting heat to the engine or parts associated with the engine until preheating is completed if it is determined that the driver intends to start driving the vehicle; and
performing running control of the vehicle while using the motor as a power source and refraining from starting the engine until the preheating is completed, wherein determining that the driver intends to start driving the vehicle comprises determining at least one of (i) a condition that a shift lever is shifted to a position enabling the vehicle to be driven, and (ii) a condition that a vehicle speed has exceeded a predetermined speed.

11. The method according to claim 10, wherein the step of determining whether the driver intends to start driving the vehicle before the engine is started includes determining whether the engine is in operation, and if the engine is not operating, reading sensors mounted on the parts associated with the engine to determine, based on the sensor readings, whether the driver intends to start driving the vehicle.

12. The method according to claim 10, wherein the step of imparting heat to the engine or parts associated with the engine until preheating includes reading a temperature of the engine or each of the parts associated with the engine, and making a determination on the necessity of preheating depending on whether the temperature of the engine or each of the parts associated with the engine has reached a predetermined temperature.

13. The method according to claim 12, wherein the step of performing running control of the vehicle while using the motor as a power source and refraining from starting the engine until the preheating is completed includes causing a flag for permitting start of the engine to be selected when it is determined in the step of imparting heat that preheating is unnecessary.

* * * * *